United States Patent [19]

Williams et al.

[11] Patent Number: 4,721,936
[45] Date of Patent: Jan. 26, 1988

[54] DOUBLE ARM TIME VARIABLE THERMOSTAT

[75] Inventors: Edward Williams, Manlius, N.Y.; Frank Martucci, 360 Tom Hunter Rd., Fort Lee, N.J. 07024

[73] Assignee: Frank Martucci, Fort Lee, N.J.

[21] Appl. No.: 46,526

[22] Filed: May 4, 1987

[51] Int. Cl.⁴ .............................................. H01H 37/62
[52] U.S. Cl. ................................. 337/302; 236/46 R; 337/301
[58] Field of Search ............... 337/301, 302, 303, 304, 337/305; 236/46 R

[56] References Cited

U.S. PATENT DOCUMENTS 3,036,470  5/1962  Houser et al. ................... 337/301
4,180,789  12/1979  Martucci ........................ 337/301

FOREIGN PATENT DOCUMENTS 1188199  4/1970  United Kingdom ............... 337/304

Primary Examiner—Harold Broome
Attorney, Agent, or Firm—Peter C. Michalos

[57] ABSTRACT

A time variable thermostat comprising, a housing, a clock connected to the housing and having a shaft which is rotatable with time and a disc connected to the shaft for rotation with the shaft. The disc has a plurality of circumferentially spaced slots each extending radially of the disc. A temperature responsive switch has an actuator movable with a change of temperature and the switch includes contacts which are closed and open depending on a position of the actuator. A double control arm is connected to the actuator and is movable with respect to the housing about a center of rotation and a pin slidably mounted to each slot and having a stop portion extending beyond the disc against which the control arm is engageable to influence closing and opening of the contacts. One arm includes a pin engagement portion movable in an arc with movement of the arm about the center of rotation.

6 Claims, 3 Drawing Figures

DOUBLE ARM TIME VARIABLE THERMOSTAT

FIELD AND BACKGROUND OF THE INVENTION

The present invention relates in general to thermostats, and in particular to a new and useful time variable thermostat having a double arm construction. One arm which rides on set pins may have notches to eliminate the need for a heat anticipator which is normally required in a thermostat.

The present invention is an improvement over the thermostat disclosed in U.S. Pat. No. 4,180,789, granted to one of the present inventors (Martucci) on Dec. 25, 1979. That disclosure is incorporated here by reference.

Virtually all thermostats now known utilize a so-called "heat anticipator" which includes a heating element that is activated for artificially heating the temperature sensing part of the thermostat. Such heat anticipators are necessary due to the inherent insensitivity of the thermostat to distinguish temperature changes within two or three degrees. As reported in Consumer Reports Buying Guide 1979 and 1980, pages 112, 113, there are disadvantages to such anticipators.

Thermostats are also known which can control both heating and cooling units, however the broad temperature range required for both heating and cooling renders it difficult to utilize the time variable thermostat concept as set forth in the above identified patent, due to the straight arm for enjoining pins in the slots of the control disc.

SUMMARY OF THE INVENTION

It is an object of the present invention to provide improvements to the time variable thermostat which avoid the need for a heat anticipator and permit a wide setting range for a heating and a cooling function. According to the present invention, the temperature sensing element of the thermostat is rendered exceedingly sensitive to temperature changes so that, while a heat anticipator can be maintained for a manual mode of operation, the heat anticipator may be cut out of the circuit during an automatic mode of operation.

A further object of the invention is to provide a configuration for the control arm which increases the temperature range that can be set for each slot, while also maintaining a perfectly tangential relationship between at least a portion of a control arm and a pin in each slot.

A still further object of the invention is to provide a control arm with a tangential part to again maintain a perfectly tangential relationship between the control arm and any circle defined by the path of any pin or stop in the disc, and to provide a notched portion of the control arm which gently rocks a mercury tilt switch. These notches substantially increase the temperature sensitivity of the thermostat, which was noted above. An indicator arm which is used to manually set the temperature is pivotally mounted to the control arm.

Another object of the invention is to provide a double arm time variable thermostat which is simple in design, rugged in construction and economical to manufacture.

The various features of novelty which characterize the present invention are pointed out with particularity in the claims annexed to and forming a part of this disclosure. For a better understanding of the invention, its operating advantages, and specific objects attained by its uses, reference should be made to the accompanying drawings and descriptive matter in which there is illustrated a preferred embodiment of the invention.

DESCRIPTION OF THE PREFERRED EMBODIMENT

Figure 1:
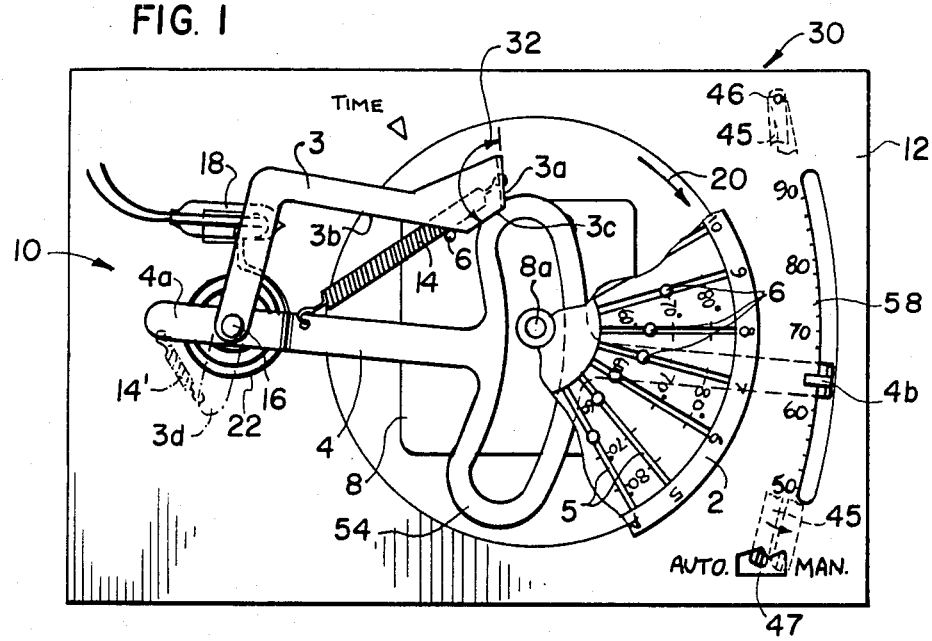
FIG. 1 is a front elevational view, with portions cut away, of one embodiment of the invention.
Figure 2:
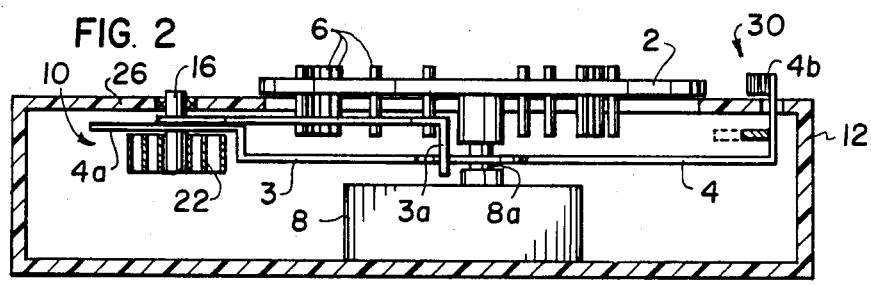
FIG. 2 is a side sectional view of FIG. 1.

Referring to the drawings in particular, the invention embodied therein, as shown in FIG. 1, comprises a time variable thermostat generally designated 30 having a housing 12 and, as shown in FIGS. 1 and 2.

All of the permanent connections to the house wiring, including wires to a heating and/or a cooling unit, are connected into housing 12. A temperature responsive switch, with a double control arm, a control disc for controlling the distribution of temperatures over the period of a day, and a clock for rotating the disc, are also mounted in the housing 12.

Referring once more to FIG. 1, the housing 12 has mounted therein, temperature responsive means generally designated 10. Means 10 includes mercury tilt switch 18 of known design which is mounted on the end of a bimetal spiral 22. The inner end of spiral 22 is privotally mounted on a front wall 26 of housing 12 and fixed to an indicator arm 4. A control arm 3 is pivotally mounted to indicator arm 4. A spring 14 is connected between arms 3 and 4 to bias an engagement projection 3a of arm 3 against an edge of arm 4.

As was learned from the co-inventor's previous U.S. Pat. No. 4,180,789, the control arm 3 rests on one or more of pins 6 at a time, each pins 6 being slid to and held fast at a desired location on a slot 5 of a control disc 2. Control disc 2 is rotated, one full rotation per day, by a clock motor 8. Any other desired period of rotation may be provided, however, for specialized purposes.

Each slot 5 is calibrated for temperature. The rotational position of arm 3 is determined by each pin 6 on which it rests, rotates the arm 4 and the entire spiral 22 with mercury switch 18, to change the point at which a heating unit (or cooling unit) is turned on and off. Since very little torque is necessary, unlike prior art thermostats including plural temperature control settings, a clock motor 8 can be used which provides a small amount of torque but which is light weight, compact and reliable. The inventor has found that a motor which is particularly suited to this purpose is the Quartz-Jeco clock motor manufactured by the Jeco Co. Limited of Tokyo, Japan.

The weight of arm 4 on the right of its pivot axis 16 is greater than its weight on the left of the pivot axis. With arms 3 and 4 moving as unit, very little pressure is exerted on pins 6 by arm 3. A counter weight portion 4a can even be provided to reduce the pressure further.

since only a small amount of torque is necessary, a low torque clock motor which is reliable can be used.

As disc 2 rotates in the direction of arrow 20 due to the shaft 8a of clock 8 to which it is connected, pin 6 ride up inclined edge or surface 3c of the L-shaped arm 3. The correct temperature set for the pin, and indicated on a scale 58 by a pointer 4b of arm 4, is reached when the pin rides onto a tangential edge or suface 3c of arm 3.

To avoid a sudden dropping of the arm 3 as pin 6 leaves edge 3c, projection 3a has an outer edge that makes an angle 32 with edge 3c.

Figure 3:
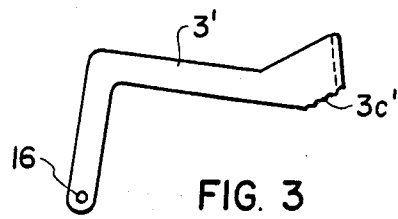
FIG. 3 is a front elevational view of another embodiment of the control arm.

In accordance with a important feature of the invention, the tangential pin engagement portion edge 3c may include small bumps or undulations 3c' which slowly rock (for example in 10 minute intervals) the mercury switch 18, as shown in FIG. 3 for arm 3. In this embodiment no anticipator is necessary since increased temperature sensitivity is achieved.

Referring back to FIG. 1, the edge 3c of arm 3 extends tengentially of all circles defining paths of all pins 6. Thus, any pin that engages edge 3c moves tangentially so that the same temperature is maintained.

Indicator arm 4 has an arcuate part 54 with an oblong hole therein to receive the clock shaft to avoid obstruction of the operation of pins 6. Arm 4 also has the pointer 46 which cooperates with the scale 58 to show the temperature setting at any time. The slots 5 on disc 2extend radially of the disc and substantially tangentially to a curved path of pins 6 as arm 3 rotated on pivot axis 16. In this way regardless of the position of arms 3 and 4, every pin 6 engages edge 3c at the correct instant. The part 54 also allows a straight radial extent of arm 4 from axis 16 to scale 58.

Rather than spring 14, arms 3 and 4 may be biased toward each other by spring 14' connected to radial projections 4a and 3d of the arms.

For manual operation, a stop 45 is provided which arcs from its pivot point 46 on front wall 26 to its end which is bent and which is hooked into a notched opening 47 of wall 26. In the dashed MAN or manual position (to the right) stop 45 engages the bent part of arm 4 that carries pointer 4b (FIG. 2). This fixes arm 4 on its axis 16, to fix the temperature (as seen on scale 58). Disc 2 may continue to rotate, however, with arm 3 riding up and down against the bias of spring 14.

While specific embodiments of the invention have been shown and described in detail to illustrate the application of the principles of the invention, it will be understood that the invention may be embodied otherwise without departing from such principles.

What is claimed is:

1. A time variable thermostat comprising:
    a housing;
    a clock motor connected to said housing and having a shaft which is rotatable with time;
    a disc connected to said shaft for rotation with said shaft, said disc having a plurality of circumferentially spaced slots each extending at a common angle with respect to radii of said disc;
    temperature responsive switch means having an actuator movable with change of temperature, said switch means including contacts which are closed and open depending on a position of said actuator;
    an indicator arm connected to said actuator and movable with respect to said housing about a center of rotation;
    a control arm pivotally mounted to said indicator arm;
    a spring means connected between said arms to engaged portions of said arms to each other for co-rotation of said arms; and
    a pin slidably mounted to each slot and having a stop portion extending beyond said disc against which said control arm is engagable to influence closing and opening of said contacts.

2. A thermostat according to claim 1 wherein control arm has a pin engagement edge which extends substantially tangentially to all circles defined by the path of all pins in said disc.

3. A thermostat according to claim 2 wherein said pin engagement portion includes indulations, said switch means comprising a mercury tilt switch, said actuator comprising a bimetal coil connected to said mercury tilt switch, said undulations spaced apart by a small distance with respect to one full rotation of said disc.

4. A thermostat according to claim 3 wherein said undulations are spaced apart by an amount corresponding to from 10 to 20 minutes, said clock rotating said disc once in 24 hours.

5. A thermostat according to claim 2 wherein said control arm is L-shaped and includes an end edge on one side of said pin engagement edge extending at an obtuse angle to said pin engagement edge, said housing including a scale, said indicator arm including an indicator part extending outwardly thereof into association with said scale.

6. A thermostat according to claim 5 wherein said indicator arm has an arcuate portion with an oblong hole for the shaft of said disc.

* * * * *